June 22, 1926.

G. ROSSITTO 1,590,062

ATTACHMENT FOR VEHICLE WHEELS

Filed May 3, 1924

Inventor
Gaetano Rossitto
By his Attorney
C. Cousins

Patented June 22, 1926.

1,590,062

UNITED STATES PATENT OFFICE.

GAETANO ROSSITTO, OF NEW YORK, N. Y., ASSIGNOR TO FOUR-IN-ONE JACK CORPORATION, A CORPORATION OF NEW YORK.

ATTACHMENT FOR VEHICLE WHEELS.

Application filed May 3, 1924. Serial No. 710,914.

This invention relates to an attachment for vehicle wheels.

In the automotive industry it is necessary to provide a jack to elevate the wheels of an automobile from the ground and so as to provide for "dead" storage so that all of the wheels are kept away from the floor. It is also necessary that in the event a car is in mud or a soft road that traction be given to the car. Cars are stolen and driven away, so that it is necessary to have some form of device to given notice of such theft. When a car is in the mud or a soft road the ordinary round tire does not given sufficient traction so that it is desirable to have a periphery to the tire having a plurality of plane surfaces.

Therefore, this invention has for its objects the following; first: to provide a jack which is easily attachable and detachable from the wheels of the car and which will operate from the driving seat; second: to provide a means for elevating the wheels while a car is in "dead" storage; third: to provide means for providing traction when the car is in the mud; fourth: to provide a means for affording detection of and preventing theft of a car; and fifth: to provide a means increasing the traction of the wheels of a car, which means comprise a plurality of planes, affording a greater traction than the ordinary round tires of the well known type.

The invention consists of the construction, combination and arrangement of parts as herein described and claimed.

In the accompanying drawing, forming a part hereof, is illustrated an embodiment of the invention, in which drawings similar reference characters designate corresponding parts and in which.

Figure 1:
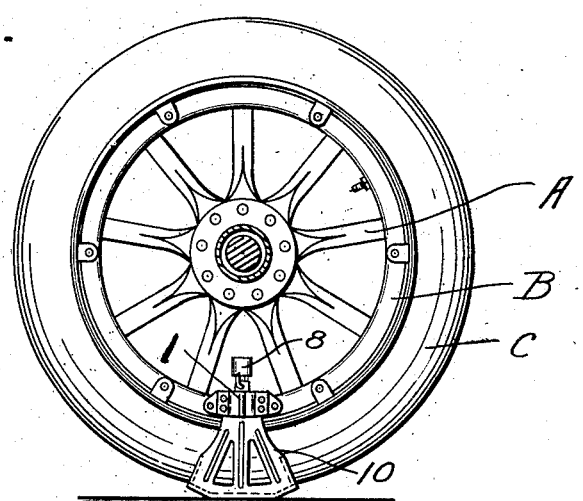
Figure 1 is a side elevation showing the attachment to an ordinary vehicle wheel.
Figure 2:
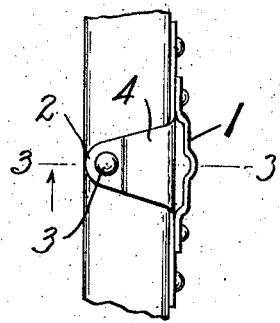
Figure 2 is a fragmentary view in plan showing the retaining member attached to a felly.
Figure 3:
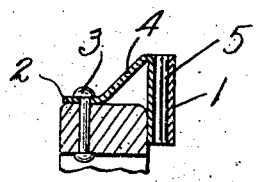
Figure 3 is a transverse section taken approximately on line 3—3 of Figure 2.
Figures 4, 5:
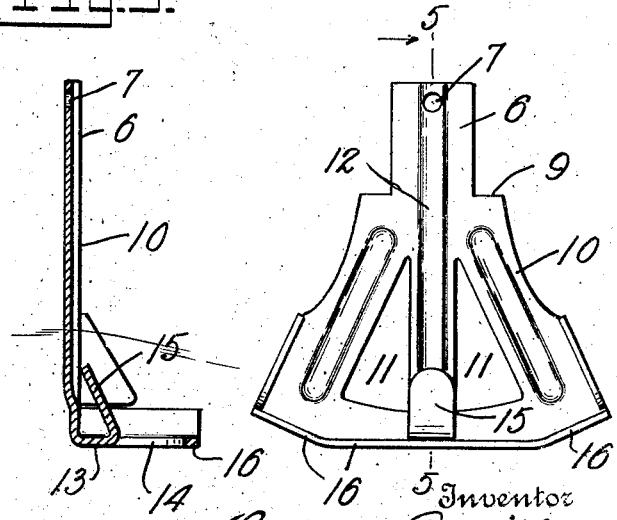
Figure 4 is a rear elevation of the insertible element of the invention.
Figure 5 is a vertical section taken approximately on line 5—5 of Figure 4.

Referring to the drawings A designates a common form of wheel having a felly B.

A socket member 1 is provided with a flange 2, so that it may be secured to the felly B, as by means of a bolt 3. The socket member is provided with an upturned portion 4, forming a strengthening brace to its body portion. The bore 5 of the socket member 1 is made to conform to the size and shape of the upper portion of the insertible member hereinafter described.

The insertible member has a reduced upper end 6 of a size and form to fit into the bore 5 of the socket member, and to project through the bore, so that an opening 7 adjacent its upper end will be exposed. The object of this construction is to permit the insertion of a locking device 8, by means of which the insertible member may be kept locked in place.

The insertible member has a shoulder 9 which fits snugly against the outer edge of the socket member 1. The body portion of the insertible member has an expanded portion 10, provided with cut out portions 11 to lighten the construction and also provided with ribs 12 to stiffen and strengthen the body.

The body portion 10 is provided with a lateral flange 13 having a cut out 14, the metal of which is bent up against the body portion to form a brace 15.

The flange is formed to present a plurality of flat planes 16, so as to provide greater traction than would be afforded by a circular tread and also to retain the car immovable when in "dead" storage.

In the operation of the invention when the upper end 6 of the insertible member is introduced into the socket the length of the insertible member is such that the flange 13 projects underneath the tire C and an appreciable distance therefrom so that when a wheel to which it is attached is rotated to a point where the device is lowermost the wheel will be elevated or "jacked". If the car is stolen or driven away by an unauthorized person the attachment being locked on will give notice. In using the attachment for the purpose of pulling a car out of the mud the broad, flat planes 16 give a traction over an area much greater than a circular tread would give.

Having thus fully described the invention what is claimed as new and desired to be secured by Letters Patent is:

1. A vehicle wheel attachment comprising a socket member fixed to the wheel and an insertible member provided with means for increasing the traction of the wheel to which it is attached.

2. A vehicle wheel attachment comprising a socket member fixed to the wheel and an insertible member provided with an expanded lower end.

3. A vehicle wheel attachment comprising a socket member fixed to the wheel and an insertible member provided with a flanged lower end.

4. A vehicle wheel attachment comprising an insertible member provided with a lower end divided into a plurality of planes.

5. A vehicle wheel attachment comprising a socket member and an insertible member provided with a plurality of planes disposed at angles variant to each other.

6. A vehicle wheel attachment comprising a socket member and an insertible member provided with a flanged lower end having a portion of the flange forced out to form a brace.

7. A vehicle wheel attachment comprising a socket member and an insertible member having cut out portions and strengthening ribs adjacent said cut-out portions.

8. A vehicle wheel attachment comprising a socket member fixed to the wheel, an insertible member arranged to coact with the socket member, and means for locking the two members together.

9. A vehicle wheel attachment comprising a socket member, an insertible member arranged to be disposed in the socket member and provided with an opening disposed outside of the socket member and means cooperating with the walls of the opening to lock the members together.

10. A vehicle wheel attachment comprising a flanged socket member and an insertible member arranged to cooperate with the socket member.

11. A vehicle wheel attachment comprising a flanged socket member and an insertible member arranged to cooperate with the socket member, the socket member being formed with an integral turned up brace.

Signed at New York in the county of New York and State of New York this 28th day of April A. D. 1924.

GAETANO ROSSITTO.